US012633156B2

(12) United States Patent (10) Patent No.: US 12,633,156 B2
Blott (45) Date of Patent: May 19, 2026

(54) METHOD, COMPUTER PROGRAM, STORAGE MEDIUM, PERSON DETECTOR AND MONITORING ARRANGEMENT FOR PERSON DETECTION

(71) Applicant: Robert Bosch GmbH, Stuttgart (DE)

(72) Inventor: Gregor Blott, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 18/548,841

(22) PCT Filed: Mar. 2, 2022

(86) PCT No.: PCT/EP2022/055299
§ 371 (c)(1),
(2) Date: Sep. 1, 2023

(87) PCT Pub. No.: WO2022/189231
PCT Pub. Date: Sep. 15, 2022

(65) Prior Publication Data
US 2024/0312237 A1     Sep. 19, 2024

(30) Foreign Application Priority Data
Mar. 10, 2021    (DE) ..................... 10 2021 202 294.4

(51) Int. Cl.
*G06V 40/10* (2022.01)
*G06V 20/52* (2022.01)
*H04N 7/18* (2006.01)
(52) U.S. Cl.
CPC ............ *G06V 40/103* (2022.01); *G06V 20/52* (2022.01); *H04N 7/181* (2013.01)
(58) Field of Classification Search
CPC ...... G06V 40/103; G06V 20/52; H04N 7/181; G08B 29/186; G08B 13/19613; G08B 13/19645
See application file for complete search history.

(56) References Cited

U.S. PATENT DOCUMENTS

2010/0176947 A1* 7/2010 Hall ..................... G08B 13/248
                                                340/572.1
2012/0328153 A1* 12/2012 Yu ......................... G06V 20/52
                                                382/103
(Continued)

FOREIGN PATENT DOCUMENTS

CN        102282594 B    12/2013
DE    102019205221 A1    10/2020

OTHER PUBLICATIONS

Translation of International Search Report for Application No. PCT/EP2022/055299 dated Jul. 4, 2022 (2 pages).
(Continued)

*Primary Examiner* — Iriana Cruz
(74) *Attorney, Agent, or Firm* — Michael Best & Friedrich LLP

(57)            ABSTRACT

Method for domain-specific person detection, wherein a monitoring area (1) is monitored by means of one or a plurality of cameras (2*a, b, c, d*), wherein the cameras (2*a, b, c, d*) each provide image data for a respective monitoring area section (3*a, b, c, d*), wherein a person detector can be operated in a detection mode and in an adaptation mode, wherein the person detector has a machine learning algorithm based on an original model for analyzing the image data and for detecting persons in the monitoring area (1), wherein, for the adaptation mode, the monitoring area (1) is temporarily restricted to a limited monitoring area (4), wherein the image data from the limited monitoring area (4) are recorded, wherein, based on the image data of the limited monitoring area (4), a domain adaptation of the original model to an application model takes place, wherein, in the detection mode, the machine learning algorithm adapted to the application model is used for analysis of the image data, for person detection and/or for person tracking.

12 Claims, 1 Drawing Sheet

(56)                    References Cited

U.S. PATENT DOCUMENTS

| | | | |
|---|---|---|---|
| 2013/0201330 A1* | 8/2013 | Thornton | G06V 10/255 |
| | | | 348/143 |
| 2017/0369288 A1* | 12/2017 | Fulton | G05B 19/0426 |
| 2020/0380252 A1* | 12/2020 | Ding | G06Q 30/0609 |
| 2023/0412919 A1* | 12/2023 | Van Der Heide | H04N 23/611 |

OTHER PUBLICATIONS

Leng et al., "A Survey of Open-World Person Re-Identification,"
IEEE Transactions on Circuits and Systems for Video Technology,
2020, vol. 30, No. 4, pp. 1092-1108.
European Patent Office Action for Application No. 22713340.2
dated Sep. 17, 2025 (10 pages including machine English transla-
tion).

* cited by examiner

Fig. 1a
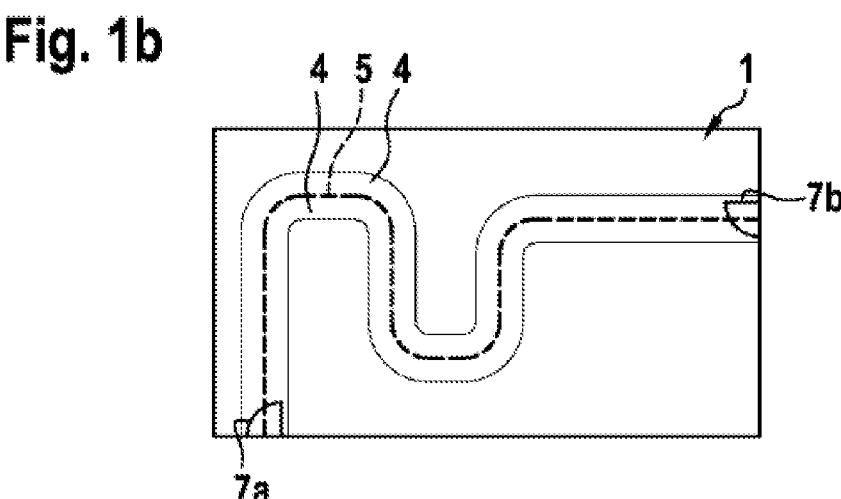
Fig. 1b
Fig. 1c
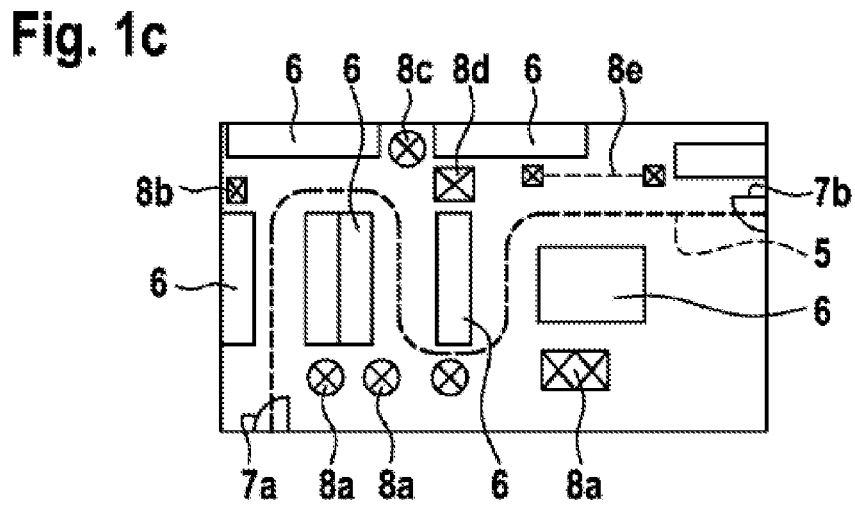

METHOD, COMPUTER PROGRAM, STORAGE MEDIUM, PERSON DETECTOR AND MONITORING ARRANGEMENT FOR PERSON DETECTION

BACKGROUND

The invention relates to a method for domain-specific person detection and/or person redetection, wherein a monitoring area is monitored with a plurality of cameras and the cameras provide image data for a respective monitoring area section.

Methods of image-based and/or video-based person detection and/or tracking are used in many areas of daily life. Such person detection is in particular also used in the retail sector, for example for analyzing visitor flows, for theft protection and/or to prevent vandalism. Such methods are often based on machine learning algorithms, and huge amounts of data are needed for reliable use to train the respective algorithm to the correct features for redetection.

The publication DE 10 2019 205 221 A1, which is probably the closest prior art, describes an anonymization device for generating anonymized images. For this purpose, a monitoring area is monitored by video technology using a camera and monitoring images are provided. A processing module is configured to anonymize the provided images based on a generating generic network.

SUMMARY

The invention relates to a method for domain-specific person detection comprising. The invention also relates to a computer program, a machine-readable storage medium comprising the computer program, a person detector and a monitoring arrangement.

The invention relates to a method for person detection and/or person redetection, in particular to domain-specific person detection. Domain-specific is in particular understood to mean detecting and/or tracking persons who are in a scene, environment, and/or in front of a background, wherein the scene, the background and/or the environment as well as camera images from a different camera pose are understood as a domain. The method is used to detect and/or track persons in front of scenes, backgrounds and/or environments that are variable, cluttered and/or non-uniform. Person detection in particular constitutes an image-based and/or video-based person detection. The person detection is configured for monitoring a monitoring area. The method is in particular configured for person detection in the monitoring area subarea, in retail and/or in stores. Person detection can in particular include analyzing and/or detecting visitor flows, thefts, and/or vandalism.

A monitoring area is monitored with one or a plurality of cameras. In particular at least ten, preferably at least fifty, monitoring cameras are arranged to monitor the monitoring area. The cameras form and/or are part of a camera network. The cameras are all configured to provide image data. The image data includes recordings, images and/or video of the section monitored and/or recorded by the respective camera. The cameras are configured to record and/or monitor a respective monitoring area section, in particular to provide image data for said section. The monitoring area sections preferably overlap at least in pairs. The monitoring area sections can alternatively be non-overlapping and a combination of non-overlapping and overlapping.

The image data is provided to a person detector. The person detector can be a software module or a hardware module. The person detector has a detection mode and an adaptation mode. It is in particular possible to switch between the detection mode and the adaptation mode. In use, the detection mode is in particular the mode for continuous and/or routine monitoring of the monitoring area and/or for person detection. The adaptation mode is in particular configured to adapt, train, and/or fine-tune the person detector to the respective application. The adaptation mode can be implemented after installation and/or mounting of the cameras, for example, and/or after the person detector is put in operation. The adaptation mode will alternatively and/or additionally be used repeatedly, for example for cyclical improvement and/or modification of the person detector.

The person detector is configured to analyze the image data. By analyzing the image data by the person detector, persons in the monitoring area are detected, tracked, and/or identified. The analysis of the image data by the person detector is based on an ML algorithm (machine learning). An ML algorithm is in particular understood to be a deep learning algorithm, for example based on a neural network. The ML algorithm is configured to detect and classify characteristics, in particular, personal characteristics, based on the image data and/or in the image data. The original model is to be understood as an original or initial conceptualization and/or a trained neural network, for example. For instance, the original model is a model trained and/or implemented in a laboratory and/or by the manufacturer for person detection, in particular tracking, based on image data. The original model specifically constitutes the basis of the neural network. The person detector is in particular configured to analyze the image data and/or detect persons across cameras and/or track persons across the monitoring area sections.

For and/or during the adaptation mode, the monitoring area is temporarily restricted to a limited monitoring area. The monitoring area is restricted to the limited monitoring area for the duration of the adaptation mode, for instance. The limited monitoring area is in particular a portion of the monitoring area. The limited monitoring area is in particular configured for targeted and/or restricted movement control of the persons in the monitoring area. For example, the limited monitoring area is configured such that people can and/or want to move only within the limited monitoring area. The limited monitoring area is in particular a portion of the monitoring area sections. The limited monitoring area serves the trackability, ordering and/or guidance of the persons, in particular in order to be able to track them uniquely and/or analyze them across cameras and/or monitoring area sections. The area of the limited monitoring area is in particular at most 70%, specifically at most 50%, in particular at most 40% of the area of the monitoring area. In the adaptation mode, image data from the limited monitoring area is recorded and/or provided by the cameras. The image data shows the or a section of the limited monitoring area. Based on the image data of the limited monitoring area, the original model is retrained, adapted, fine-tuned, modified, and/or domain-adapted. The original model thus becomes an application model. The original model, specifically the laboratory model, is in particular retrained to the application model, fine-tuned, modified to the monitoring area and/or use, wherein the original model and/or laboratory model is modified to the application, the domain, the conditions on site. The original model is modified to installation parameters of the cameras. for instance, for example installation height, camera parameters, network density, background, scenery and/or variety of objects. The domain adaptation can in particular be carried out online, for example for retraining based on resources (computer network) of the manufacturer.

In the detection mode, the ML algorithm is executed based on the application model and/or the ML algorithm is adapted and/or modified to the application model. In the detection mode, the ML algorithm is used, in particular together with the application model, to analyze the image data, in particular the image data of the unlimited monitoring area and/or the monitoring area sections. The person detection, for example redetection, and/or cross-camera person tracking, is carried out through the analysis and/or the use the ML algorithm together with the application model. The ML algorithm adapted to the application model expands the laboratory-trained and/or implemented original model to the application model, which is specific and/or modified to the applications, scenery and/or the surrounding area.

The invention is based on the consideration that an original model for person detection in a monitoring area at a customer and/or user has to be adapted to the environment and/or domain-specifically fine-tuned, wherein restricting the monitoring area to a limited monitoring area enables a simple, targeted, controlled and resource-conserving retraining and/or fine-tuning. Specifically controlling the movements of objects and/or persons to a limited monitoring area allows basic assumptions about the movement of persons to be applied during retraining and/or adaptation. It is in particular possible to provide all necessary views and/or parameters for retraining by defining the limited monitoring area. This also enables an improved allocation by a ground truth.

It is in particular provided that the monitoring area is restricted to specify a target trajectory for persons to the limited monitoring area. In other words, the limited monitoring area is configured and/or set up to guide persons along the target trajectory, wherein the target trajectory describes a two-dimensional route or path. The monitoring area is restricted to the limited monitoring area such that persons in the monitoring area have to follow a specified route or the target trajectory, for instance, so that the persons are moved through the monitoring area sections in a targeted manner and/or can be tracked across cameras. The trackability, disappearance and/or appearance of persons in the monitoring area sections can thus be controlled, regulated and/or specified. The limited monitoring area is in particular configured to be free of branching, so that the target trajectory and/or the flows of persons do not divide, flow together or mix, for example. This embodiment is based on the consideration that, by defining a target trajectory, the original model can be fine-tuned, adapted and/or retrained to the application model in a targeted and efficient manner.

It is particularly preferred that the limited monitoring area and/or the target trajectory includes, defines and/or specifies points of change. Points of change are in particular part of the monitoring area and/or the limited monitoring area. At points of change, persons are encouraged, guided and/or instructed to change direction and/or pivot their view. Points of change are inflection points, curve areas and/or path markings, for instance, at which persons have to turn, pivot, turn off, turn around or change the direction of movement. Change of direction means changing the movement of persons, for example, for instance turning left or turning right. A pivot of view is preferably to be understood as a rotation and/or pivoting of a person about a longitudinal axis and/or height, in particular a pivoting of the head and/or the direction of view. With the pivot of view and/or change of direction, the limited monitoring area and/or the point of change allows persons to be seen in the image data and/or cameras from different and/or specifically selected views, for example from the front, from the rear, and/or the side.

Specifically, it is provided that the limited monitoring area and/or the target trajectory is configured to specify a movement of persons in a single lane and/or restrict the movement of persons to one lane. Alternatively and/or additionally, the limited monitoring area and/or the target trajectory is configured to specify a minimum distance between two consecutive persons and/or avoid persons obscuring one another in the image data and/or cameras. For instance, the limited monitoring area is selected such that a person cannot be moving in the same direction, in particular the preferred direction, next to another person. A minimum distance can be specified and/or regulated by means of markings or a gate, for example. Persons obscuring one another is in particular excluded by means of the target trajectory and/or the limited monitoring area, so that the image data includes all relevant recordings and/or views of persons without losing relevant data and/or views as a result of persons obscuring one another.

Restricting the monitoring area to the limited monitoring area is in particular carried out using guide elements. For this purpose, the guide elements are disposed in particular in the monitoring area. The guide elements are obstacles, barriers, furniture, shelves, markings, stand-up displays, advertising materials, or placed merchandise, for example.

It is particularly preferred that the guide elements are camouflaged, domain-adapted, application-adapted and/or scene-adapted. The guide elements are in particular designed such that they are not perceived by persons as explicit guide elements and/or their function as a guide element is not obvious. Guide elements can thus be configured as objects of the domain, the monitoring area and/or the scene, for example, for instance as shelves, an arrangement of goods for advertising purposes and/or advertising displays. This configuration is based on the consideration of monitoring persons in situation-typical and/or non-artificial situations and/or behavior patterns for optimal training and/or fine-tuning of the original model, for example to be able to monitor vandalism and theft in routine operation.

One embodiment of the invention provides that a limitation model is determined. The limitation model specifies, describes, and/or indicates how the course of the target trajectory, the limited monitoring area and/or the guide elements should be arranged. The limitation model is configured as a plan for the arrangement and/or the course of the limited monitoring area, for instance. The limitation model is determined based on machine learning and/or a neural network, for example. The limitation model is determined and/or specified based on monitoring area parameters, a monitoring area model, a camera parameter, a camera distribution, the original model and/or the application of the method. For example, a plan of the monitoring area and/or an arrangement of goods in the monitoring area is provided as a monitoring area parameter. Camera parameters can be installation parameters, for example, or internal parameters, such as focal length and/or focus. The camera distribution indicates which camera shows which monitoring area sections, for example, and/or whether there are overlaps between the monitoring area sections. In other words, the limitation model is preferably selected such that an effective restriction to the limited monitoring area and/or arrangement of the guide elements is proposed based on the framework conditions and/or parameters, so that users do not have to carry out restrictions randomly.

It is particularly preferred that the domain adaptation, in particular the modification of the original model to the application model, is carried out based on metadata and/or uses metadata. Metadata are a model of the monitoring area, 3-D or 2-D model, for example, a model of the limited monitoring area, the target trajectory and/or its course, the arrangement of the guide elements and/or camera parameters. Based on the use of the metadata, an especially optimized and quick modification of the original model to the application model is possible.

It is in particular provided that the limited monitoring area is configured to provide different views of a person in the limited monitoring area as image data. The different views can be recorded and/or provided as image data of a camera. Alternatively, the limited monitoring area is arranged and/or configured to provide the different views of the persons for image data from different cameras.

One embodiment of the invention provides that the adaptation mode is implemented and/or applied periodically. The adaptation mode is implemented daily, weekly, or annually, for example. The adaptation mode can alternatively and/or additionally be carried out and/or scheduled when changes are made in the monitoring area, for example in the merchandise, the spatial design, the scenery and/or the application. It is thus possible to check and/or ensure that the application model remains consistent over time and/or grows or evolves along with its application, for example.

A computer program for execution on a computer, a person detector, and/or a computer is a further subject matter of the invention. The computer program is configured and/or set up to carry out and/or support the method as described above when executed.

A further subject matter of the invention is a machine-readable storage medium, for example a DVD or hard disk memory. The machine-readable storage medium is in particular a non-volatile storage medium. The computer program is stored on the storage medium.

Another subject matter of the invention is a person detector. The person detector is in particular configured or set up to carry out and/or apply the method according to the invention. The person detector is configured to detect and/or track one or more persons in a monitoring area. The person detector is in particular configured for use in the retail sector, in particular for monitoring a shopping area, a business area and/or retail. The person detector is connected to a plurality of cameras and/or the person detector is provided with image data from the cameras. The image data shows a respective monitoring area section recorded by the respective camera. The person detector can adopt and/or be operated in an adaptation mode and a detection mode. In the adaptation mode, the person detector is configured to domain-specifically modify, fine-tune and/or retrain the original model of the person detector based on image data of a limited monitoring area, for example restricted by guide elements. The domain-specific modification is in particular carried out for cross-camera tracking and/or detection of persons in the monitoring area takes place. The person detector is configured to apply an ML algorithm in the detection mode using the application model. The application of the ML algorithm and the application model to the image data was carried out for the analysis of the image data, person detection and/or person tracking in the monitoring area.

It is particularly preferred that the person detector comprises a suggestion module and/or the method comprises a suggestion mode. The suggestion module can in particular include an input module and/or an output module, specifically a display module. The output module is preferably a display screen. The suggestion mode can in particular include an input mode and/or an output mode. The suggestion module or the suggestion mode is configured, in particular based on monitoring area parameters, for example a geometry, a course and/or a plan of the monitoring area, scene information, for example arrangement of goods, application information, and metadata, to suggest, determine and/or display, in particular display on a screen, a course and/or arrangement of the limited monitoring area. The suggestion module or the suggestion mode displays the placement and/or arrangement of guide elements and/or a course of the limited monitoring area, for example, so that this can be implemented in reality for effective model adaptation.

A monitoring arrangement with at least one camera and/or a camera network comprising a plurality of cameras, and the person detector, is another subject matter of the invention. The cameras and/or the camera network is connected with respect to data to the person detector, so that the image data of the cameras and/or the camera network are provided to the person detector.

BRIEF DESCRIPTION OF THE DRAWINGS

Further configurations, effects and advantages of the invention will emerge from the accompanying figures and their description. The figures show:

FIGS. 1*a*, *b* and *c* each illustrate an example of a monitoring area for domain-specific person detection.

DETAILED DESCRIPTION

FIG. 1*a* shows an example of a map of a monitoring area 1, which is video-monitored by means of a plurality of cameras 2*a*, *b*, *c*, *d*. The cameras 2*a*, *b*, *c*, *d* record image data for a respective monitoring area section 3*a*, *b*, *c*, *d*, wherein the image data are provided to a person detector. The person detector is part of the monitoring device for monitoring the monitoring area 1, for instance. The monitoring area sections 2*a*, *b*, *c*, *d* are arranged to overlap with adjacent monitoring area sections.

The monitoring area is domain-specifically monitored for persons by means of the person detector. The person detector is configured to detect and/or track persons in the monitoring area, specifically in the scene and the backgrounds in the image data. The person detector and/or the person detection is based on an original model and the application of an ML algorithm. The original model is the model for person detection based on general and/or manufacturer-implemented training, for example. For reliable monitoring and/or person detection, the original model has to be adapted, fine-tuned, retrained and/or modified to the applications, domain, sceneries and/or circumstances at the user. For effective and versatile use, the original model is trained to the application model in the monitoring area 1, wherein a limited monitoring area 4 is temporarily generated for this purpose. The person detector operates and/or the person detection is carried out using the application model.

FIG. 1*b* shows an example of a limited monitoring area 4 for the monitoring area of FIG. 1. The limited monitoring area 4 comprises and/or defines a target trajectory 5. The target trajectory specifies a path to be followed by persons in the monitoring area, in particular to restrict the freedom of movement of persons to this area. The target trajectory 5 and/or the limited monitoring area 4 are arranged and/or configured to guide persons from monitoring area section 3a, b, c, d to monitoring area section 3a, b, c, d and/or from camera 2a, b, c, d to camera 2a, b, c, d, so that image data for generating the application model based on the original model are obtained for the persons in the different monitoring area sections 3a, b, c, d. This in particular makes it possible to avoid a loss and/or confusion of persons when the monitoring area sections 3a, b, c, d change.

FIG. 1c shows an example of a schematic plan of the monitoring area 1 of FIG. 1a, b. Merchandise displays 6, for example shelves, are arranged in the monitoring area. Guide elements 8a, b, c, d, e are placed to specify a path from an entrance 7a to an exit 7b for the persons in the form of the target trajectory 5. The guide elements 8a, b, c, d, e are arranged and/or are in place during the adaptation mode.

The guide element 8a is configured as a temporary structural measure in the form of a barrier, for instance, specifically using barrier tape and/or an artificial construction site. The guide element 8b is a positioned pallet with carpeting, for example, and the guide element 8c is a positioned crate. The guide element 8d is a positioned advertising display and guide element 8e is an advertising banner. The guide elements 8a, b, c, d, e are configured to force the persons onto the path of the target trajectory, wherein the guide elements 8a, b, c, d, e are preferably configured to be unobtrusive and/or blend into the surroundings.

The invention claimed is:

1. A method for domain-specific person detection, the method comprising:
   monitoring a monitoring area (1) by means of one or a plurality of cameras (2a, b, c, d), wherein the cameras (2a, b, c, d) each provide image data for a respective monitoring area section (3a, b, c, d), and
   switchingly operating a person detector in a detection mode and in an adaptation mode, wherein the person detector comprises a machine learning algorithm based on an original model for analyzing the image data and for detecting persons in the monitoring area (1), wherein,
      for the adaptation mode, the monitoring area (1) is temporarily restricted to a limited monitoring area (4), wherein the limited monitoring area (4) is a subset of the monitoring area (1), wherein the monitoring area (1) is restricted in order to specify a target trajectory (5) for persons to the limited monitoring area (4) and the target trajectory (5) includes and/or defines points of change, wherein a change of direction and/or a pivot of view is specified at the points of change of a person, wherein the image data from the limited monitoring area (4) are recorded, wherein a domain adaptation of the original model to an application model is carried out based on the image data of the limited monitoring area (4), and
      wherein, in the detection mode, the machine learning algorithm adapted to the application model is used to analyze the image data, for person detection and/or for person tracking.

2. The method according to claim 1, wherein the limited monitoring area (4) and/or the target trajectory (5) is configured to specify a movement of persons in a single lane, specify a minimum distance between two persons and/or avoid persons obscuring one another in the image data.

3. The method according to claim 1, wherein guide elements (8a, b, c, d, e) are arranged to restrict the monitoring area (1) to the limited monitoring area (4).

4. The method according to claim 3, wherein the guide elements (8a, b, c, d, e) are camouflaged, domain-adapted and/or scene-adapted.

5. The method according to claim 1, wherein a limitation model is determined based on a monitoring area parameter, a camera parameter, a camera distribution, the original model and/or an application, wherein the limitation model describes the limited monitoring area (4), its course and/or an arrangement of guide elements (8a, b, c, d, e).

6. The method according to claim 1, wherein the domain adaptation is carried out using metadata, wherein the metadata comprises a model of the monitoring area (1), a model of the limited monitoring area (4), the target trajectory (5), an arrangement of guide elements (8a, b, c, d, e) and/or camera parameters.

7. The method according to claim 1, wherein the limited monitoring area (5) is configured to provide different views in the image data of a person in the limited monitoring area (4).

8. The method according to claim 1, wherein the adaptation mode is implemented periodically and/or is implemented after a change in the monitoring area.

9. The method according to claim 1, wherein the method comprises a suggestion mode, wherein, in the suggestion mode, a course and/or a placement of the limited monitoring area is determined and/or displayed.

10. A non-transitory, machine-readable storage medium comprising instructions that when executed by a computer cause the computer to:
   monitor a monitoring area (1) via a plurality of cameras (2a, b, c, d), wherein the cameras (2a, b, c, d) each provide image data for a respective monitoring area section (3a, b, c, d), and
   switchingly operate a person detector in a detection mode and in an adaptation mode, wherein the person detector comprises a machine learning algorithm based on an original model for analyzing the image data and for detecting persons in the monitoring area (1), wherein, for the adaptation mode, the monitoring area (1) is temporarily restricted to a limited monitoring area (4), wherein,
      the image data from the limited monitoring area (4) are recorded, wherein a domain adaptation of the original model to an application model is carried out based on the image data of the limited monitoring area (4), wherein the limited monitoring area (4) is a subset of the monitoring area (1), wherein the monitoring area (1) is restricted in order to specify a target trajectory (5) for persons to the limited monitoring area (4) and the target trajectory (5) includes and/or defines points of change, wherein a change of direction and/or a pivot of view is specified at the points of change of a person, wherein,
      in the detection mode, the machine learning algorithm adapted to the application model is used to analyze the image data, for person detection and/or for person tracking.

11. A person detector for detecting and/or tracking a person in a monitoring area (1), wherein the person detector is configured to receive image data from one or a plurality of cameras (2a, b, c, d), and the person detector is configured to operate in an adaptation mode and a detection mode, wherein, in the adaptation mode, the person detector is configured to domain-specifically modify an original model to an application model based on image data of a limited monitoring area (4), wherein the limited monitoring area (4) is a subset of the monitoring area (1), wherein the monitoring area (1) is restricted in order to specify a target trajectory (5) for persons to the limited monitoring area (4) and the target trajectory (5) includes and/or defines points of change, wherein a change of direction and/or a pivot of view is specified at the points of change of a person, wherein, in the detection mode, the person detector is configured to adapt a machine learning algorithm to the application model and use it to analyze the image data, person detection and/or person tracking.

12. A monitoring arrangement comprising at least one camera and a person detector according to claim 11.

\* \* \* \* \*